(12) United States Patent
Xu

(10) Patent No.: US 12,390,933 B2
(45) Date of Patent: Aug. 19, 2025

(54) SERVICE ROBOT AND DISPLAY CONTROL METHOD THEREOF, CONTROLLER AND STORAGE MEDIUM

(71) Applicant: JINGDONG TECHNOLOGY INFORMATION TECHNOLOGY CO., LTD., Beijing (CN)

(72) Inventor: Zhetao Xu, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 264 days.

(21) Appl. No.: 17/777,250

(22) PCT Filed: Nov. 10, 2020

(86) PCT No.: PCT/CN2020/127751
§ 371 (c)(1),
(2) Date: May 16, 2022

(87) PCT Pub. No.: WO2021/109806
PCT Pub. Date: Jun. 10, 2021

(65) Prior Publication Data
US 2022/0402142 A1    Dec. 22, 2022

(30) Foreign Application Priority Data
Dec. 3, 2019    (CN) .......................... 201911220522.1

(51) Int. Cl.
*B25J 9/16*    (2006.01)
*B25J 11/00*    (2006.01)

(52) U.S. Cl.
CPC ........... *B25J 9/1694* (2013.01); *B25J 11/008* (2013.01)

(58) Field of Classification Search
CPC ...... B25J 9/1694; B25J 13/086; B25J 19/023; B25J 19/026; B25J 9/1602; B25J 11/001; B25J 11/0015
See application file for complete search history.

(56) References Cited

U.S. PATENT DOCUMENTS

| | | | |
|---|---|---|---|
| 2012/0182392 A1* | 7/2012 | Kearns | B25J 11/009 348/46 |
| 2020/0047348 A1* | 2/2020 | Park | G06F 40/30 |

(Continued)

FOREIGN PATENT DOCUMENTS

| | | |
|---|---|---|
| CN | 106054895 A | 10/2016 |
| CN | 106355242 A * | 1/2017 |

(Continued)

OTHER PUBLICATIONS

CN-109940638-A translation attached to FOR (Year: 2019).*

(Continued)

*Primary Examiner* — Thomas E Worden
*Assistant Examiner* — Benjamin J Brosh
(74) *Attorney, Agent, or Firm* — Myers Bigel, P.A.

(57) ABSTRACT

Provided are a service robot and a display control method thereof, a controller and a storage medium. The service robot display control method comprises receiving a start signal sent by a human body recognition sensor, wherein the human body recognition sensor outputs the start signal to a controller in the case where a user appears within a predetermined range around the service robot, and controlling the mounted device to start operation in the case where the start signal is received. A first display screen of the robot is in a standby state when there is no user, and when a user approaches the robot, the first display screen starts to light up.

12 Claims, 6 Drawing Sheets

(56) References Cited

U.S. PATENT DOCUMENTS

| | | | | |
|---|---|---|---|---|
| 2020/0130197 A1* | 4/2020 | Roh | ........................ | B25J 19/026 |
| 2020/0401148 A1* | 12/2020 | Hong | ................. | G01C 21/3841 |

FOREIGN PATENT DOCUMENTS

| | | | | |
|---|---|---|---|---|
| CN | 206170100 | U | | 5/2017 |
| CN | 106956274 | A | | 7/2017 |
| CN | 107825438 | A | | 3/2018 |
| CN | 107891430 | A | | 4/2018 |
| CN | 107932511 | A | | 4/2018 |
| CN | 207189673 | U | | 4/2018 |
| CN | 108346243 | A | | 7/2018 |
| CN | 109062482 | A | | 12/2018 |
| CN | 208262848 | U | * | 12/2018 |
| CN | 109940638 | A | * | 6/2019 |
| CN | 209022077 | U | | 6/2019 |
| CN | 110154056 | A | * | 8/2019 |
| CN | 110653812 | A | | 1/2020 |
| CN | 110861107 | A | | 3/2020 |
| CN | 111230927 | A | * | 6/2020 |
| JP | 2002350555 | A | * | 12/2002 |
| JP | 2007221300 | A | | 8/2007 |
| JP | 2013-21405 | A | * | 1/2013 |
| JP | 2017164854 | A | | 9/2017 |
| WO | 2018117514 | A1 | | 6/2018 |
| WO | 2019004744 | A1 | | 1/2019 |
| WO | WO-2019033845 | A1 | * | 2/2019 |

OTHER PUBLICATIONS

CN-110154056-A translation attached to FOR (Year: 2019).*
CN-208262848-U translation attached to FOR (Year: 2018).*
CN-106355242-A translation attached to FOR (Year: 2017).*
Foreign patent documents are provided with an English translation in a combined PDF with this office action.*
CN 109940638 A, Wang et al., "Robot, robot control method, device, storage medium and controller", Filed: Apr. 26, 2019, Published : Jun. 28, 2019, English Translation (Year: 2019).*
CN 208262848 U, An, "A kind of intellect service robot", Filed: Mar. 19, 2018, Pub: Dec. 21, 2018, English Translation (Year: 2018).*
CN 110154056 A, Zuo, "Service robot and its man-machine interaction method", Filed: Jun. 17, 2019, Pub: Aug. 23, 2019, English Translation (Year: 2019).*
CN 106355242 A, Chen et al., "Interactive robot on basis of human face detection", Filed: Sep. 26, 2016, Pub: Jan. 25, 2017, English Translation (Year: 2017).*
JP 2002350555 A, Sakagami, "Human Presence Detector", Filed: May 28, 2001 Pub: Dec. 4, 2002, English Translation (Year: 2002).*
WO 2019/033845 A1, Zhang, "Active Interaction Method and System of Robot",, Filed: Jun. 19, 2018 Pub: Feb. 21, 2019, English Translation (Year: 2019).*
JP 2013-21405 A, Baba et al., "Power Supply Control Device, Image Processing Device, and Power Supply Control Program", Filed : Jul. 7, 2011 Pub: Jan. 31, 2013, English Translation (Year: 2013).*
"Communication with Supplementary European Search Report", EP Application No. 20895347.1, Oct. 24, 2023, 9 pp.
"First Office Action and English language translation", CN Application No. 201911220522.1, Jul. 15, 2020, 23 pp.
"International Search Report and English language translation", International Application No. PCT/CN2020/127751, Feb. 18, 2021, 8 pp.

* cited by examiner

SERVICE ROBOT AND DISPLAY CONTROL METHOD THEREOF, CONTROLLER AND STORAGE MEDIUM

CROSS-REFERENCE TO RELATED APPLICATIONS

The present application is a U.S. National Stage Application under 35 U.S.C. § 371 of International Patent Application No. PCT/CN2020/127751, filed on Nov. 10, 2020, which is based on and claims priority to China Patent Application No. 201911220522.1 filed on Dec. 3, 2019, the disclosures of both of which are incorporated by reference herein in their entireties.

TECHNICAL FIELD

The present disclosure relates to the field of logistics, in particular to a service robot and a display control method thereof, a controller, and a storage medium.

BACKGROUND

The development of artificial intelligence technology enhances the marketing of the service robot. Display interaction is one of the important interaction methods of the service robot.

SUMMARY

According to one aspect of the present disclosure, a service robot is provided. The service robot comprises: a human body recognition sensor configured to detect whether a user appears within a predetermined range around the service robot; a controller; and a mounted device, wherein the human body recognition sensor is configured to output a start signal to the controller in the case where a user appears within a predetermined range around the service robot, the controller is configured to control the mounted device to start operation in the case where the start signal is received, and the mounted device is configured to start operation according to a control instruction of the controller.

In some embodiments of the present disclosure, the mounted device comprises at least one distance sensor, wherein the distance sensor is configured to measure a distance between the user and the service robot after the operation is started; and the controller is configured to determine an orientation of the user relative to the service robot according to the distance of the user relative to the service robot and a position of the distance sensor, and control a head of the service robot to rotate to the orientation corresponding to the user along the horizontal direction.

In some embodiments of the present disclosure, the mounted device comprises a plurality of distance sensors, wherein the sum of detection ranges of all the distance sensors contains a detection range of the human body recognition sensor.

In some embodiments of the present disclosure, wherein the human body recognition sensor and all the distance sensors are provided on the service robot; and the distance sensors are all arranged on the same horizontal plane at a predetermined distance from the human body recognition sensor.

In some embodiments of the present disclosure, wherein the distance sensors are symmetrically arranged on both sides of a plane perpendicular to the horizontal plane passing through the human body recognition sensor in the case where the mounted device comprises an even number of distance sensors; and one distance sensor is arranged on the plane perpendicular to the horizontal plane passing through the human body recognition sensor, and the other distance sensors are symmetrically arranged on both sides of the plane perpendicular to the horizontal plane passing through the human body recognition sensor in the case where the mounted device comprises an odd number of distance sensors.

In some embodiments of the present disclosure, the mounted device comprises a first display screen, wherein the first display screen is arranged on the head of the service robot; and the controller is configured to control the first display screen to rotate to the orientation corresponding to the user along the horizontal direction according to the distance and orientation of the user relative to the service robot, and control the first display screen to make corresponding expression changes.

In some embodiments of the present disclosure, the mounted device further comprises a camera arranged above the first display screen, wherein the camera is configured to capture a camera view in the case where the controller receives the start signal; the controller is configured to recognize a face area in the camera view, and adjust a pitch angle and a horizontal angle of the first display screen according to a position of the face area in the camera view so that the face area is located in the central area of the camera view.

In some embodiments of the present disclosure, the mounted device further comprises a second display screen configured to display corresponding service content to the user according to an instruction of the controller in the case where the controller receives the start signal.

In some embodiments of the present disclosure, the controller comprises a single-chip microcontroller and a robot processor, wherein: the single-chip microcontroller is connected to the robot processor through a CAN bus; the single-chip microcomputer is connected to the pitch mechanism, the distance sensor and the first display screen respectively; and the robot processor is connected to the camera and the second display screen respectively.

According to another aspect of the present disclosure, a display control method of a service robot is provided. The method comprises: receiving a start signal sent by a human body recognition sensor, wherein the human body recognition sensor detects whether a user appears within a predetermined range around the service robot, and outputs the start signal to the controller in the case where a user appears within a predetermined range around the service robot; and controlling the mounted device to start operation in the case where the start signal is received.

In some embodiments of the present disclosure, the controlling the mounted device to start operation comprises: controlling a distance sensor to start operation, and measuring a distance between the user and the service robot; and the display control method of a service robot further comprises: determining an orientation of the user relative to the service robot according to the distance of the user relative to the service robot and a position of the distance sensor, and controlling the head of the service robot to rotate to the orientation corresponding to the user along the horizontal direction.

In some embodiments of the present disclosure, the display control method of a service robot further comprises: controlling the first display screen to rotate to an orientation corresponding to the user along the horizontal direction according to the distance and orientation of the user relative to the service robot, and controlling the first display screen to make corresponding expression changes.

In some embodiments of the present disclosure, the controlling the mounted device to start operation comprises: controlling a camera to start operation, and capturing a camera view; and the display control method of a service robot further comprises: recognizing the face area in the camera view, and adjusting a pitch angle and a horizontal angle of the first display screen according to a position of the face area in the camera view, so that the face area is located in the central area of the camera view.

According to another aspect of the present disclosure, a controller is provided. The controller comprises: a signal receiving module configured to receive a start signal sent by a human body recognition sensor; and a mounting control module, wherein the human body recognition sensor detects whether a user appears within a predetermined range around the service robot, and outputs a message to the mounting control module a start signal in the case where a user appears within a predetermined range around the service robot, the mounting control module is configured to control a mounted device to start operation in the case where the start signal is received, and the controller is configured to perform operations of implementing the display control method of a service robot according to any one of the above-described embodiments.

According to another aspect of the present disclosure, a controller is provided. The controller comprises a memory configured to store instructions; and a processor configured to execute the instructions, so that the controller performs operations of implementing the display control method of a service robot according to any one of the above-described embodiments.

According to another aspect of the present disclosure, a computer readable storage medium is provided, wherein the computer readable storage medium stores computer instructions that, when executed by a processor, implement the service robot display control method according to any one of the above-described embodiments.

BRIEF DESCRIPTION OF THE ACCOMPANYING DRAWINGS

In order to more explicitly explain the embodiments of the present disclosure or the technical solutions in the relevant art, a brief introduction will be given below for the accompanying drawings required to be used in the description of the embodiments or the relevant art. It is obvious that, the accompanying drawings described as follows are merely some of the embodiments of the present disclosure. For those skilled in the art, other accompanying drawings may also be obtained according to such accompanying drawings on the premise that no inventive effort is involved.

DETAILED DESCRIPTION

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those skilled in the art on the premise that no inventive effort is involved shall fall into the protection scope of the present disclosure.

Unless otherwise specified, the relative arrangements, numerical expressions and numerical values of the components and steps expounded in these examples shall not limit the scope of the present invention.

At the same time, it should be understood that, for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatuses shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

The inventors have found through research and development that, the display screen of the service robot in the related art uses a fixed method such that the display screen of the robot is always in an on state when the robot is in an operation state, and may not make corresponding interactions as a person approaches or moves away.

In view of at least one of the above technical problems, the present disclosure provides a service robot and a display control method thereof, a controller and a storage medium, which improve the performance of display interaction of the service robot.

Figure 1:
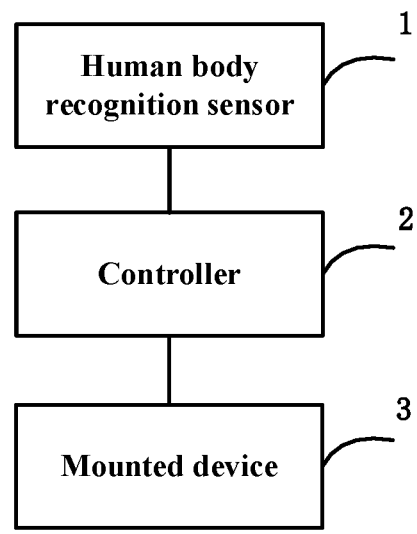
FIG. 1 is a schematic view of some embodiments of the service robot according to the present disclosure.
Figure 2:
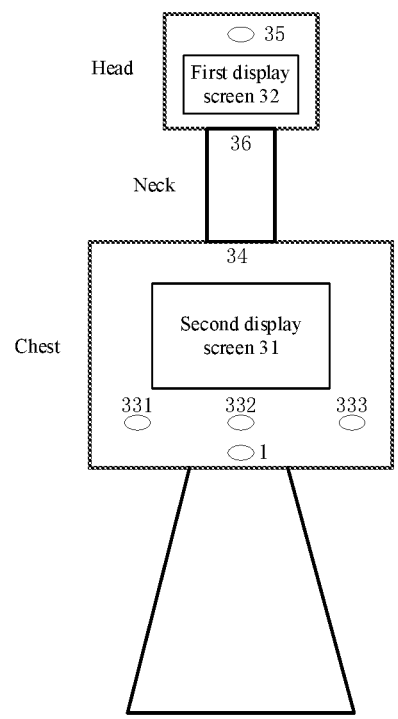
FIG. 2 is a schematic view of the position of each module of the service robot in the service robot in some embodiments of the present disclosure.

FIG. 1 is a schematic view of some embodiments of the service robot according to the present disclosure. FIG. 2 is a schematic view of the position of each module of the service robot in the service robot in some embodiments of the present disclosure.

As shown in FIG. 1, the service robot according to the present disclosure may comprise a human body recognition sensor 1, a controller 2 and a mounted device 3.

The human body recognition sensor 1 is configured to detect whether a user appears within a predetermined range around the service robot; and output a start signal to the controller 2 in the case where a user appears within a predetermined range around the service robot.

In some embodiments of the present disclosure, the human body recognition sensor 1 may also be configured to output a start signal to the controller 2 in the case where a distance between the user and the service robot is less than or equal to the predetermined distance.

In some embodiments of the present disclosure, the human body recognition sensor may be implemented as an infrared pyroelectric sensor.

In some embodiments of the present disclosure, as shown in FIG. 2, the human body recognition sensor 1 is a human body recognition sensor located on the chest of the service robot with a detection angle of 120° and a detection distance of 2 meters.

The controller 2 is configured to control the mounted device 3 to start operation in the case where the start signal is received.

In some embodiments of the present disclosure, the human body recognition sensor 1 may also be configured to output a standby signal to the controller 2 in the case where a distance between the user and the service robot is greater than the predetermined distance.

The controller 2 may also be configured to control the mounted device 3 to be in a standby state in the case where the standby signal is received.

The mounted device 3 is configured to start operation according to a control instruction of the controller 2.

Figure 3:
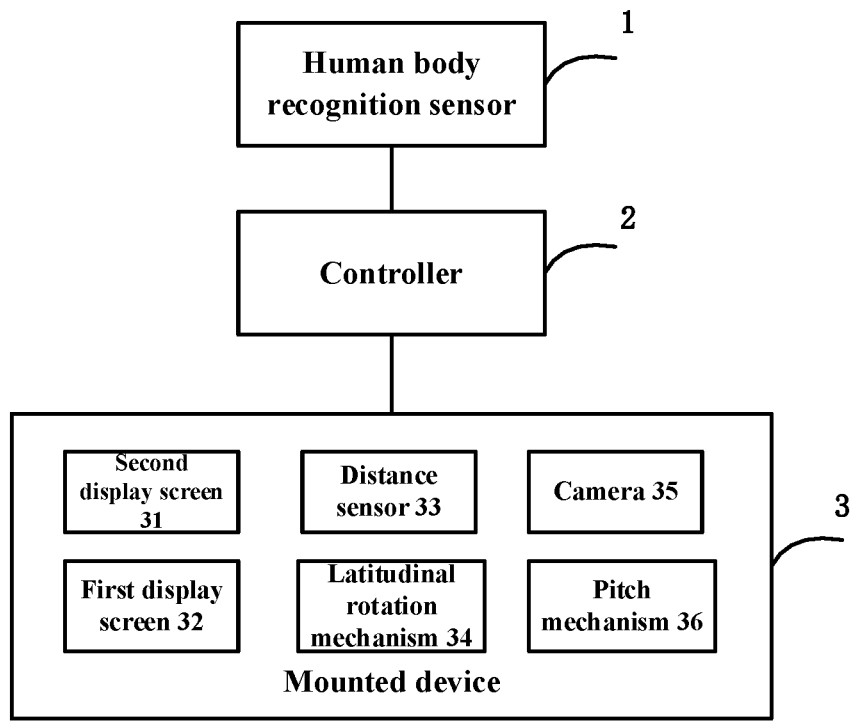
FIG. 3 is a schematic view of other embodiments of the service robot according to the present disclosure.

FIG. 3 is a schematic view of other embodiments of the service robot according to the present disclosure. As shown in FIG. 3, for the mounted device 3 of the present disclosure in some embodiments of the present disclosure, the mounted device 3 may comprise at least one of a second display screen 31 and a first display screen 32.

The second display screen 31 and the first display screen 32 are configured to display the corresponding content to the user according to an instruction of the controller 2 in the case where the controller receives the start signal.

In some embodiments of the present disclosure, as shown in FIG. 2, the second display screen 31 is located on the chest of the service robot; the human body recognition sensor 1 is located below the second display screen 31, and the first display screen 32 is located on the head of the service robot.

In some embodiments of the present disclosure, the second display screen 31 may be a service content display screen, and the first display screen 32 may be an expression screen.

In some embodiments of the present disclosure, as shown in FIGS. 2 and 3, the mounted device 3 in the embodiment of FIG. 1 or 3 may further comprise a distance sensor 33, wherein the distance sensor 33 is configured to measure a distance between the user and the service robot after the operation is started.

In some embodiments of the present disclosure, the distance sensor 33 may be implemented as a distance sensor such as an ultrasonic sensor and an optical sensor.

Figure 4:
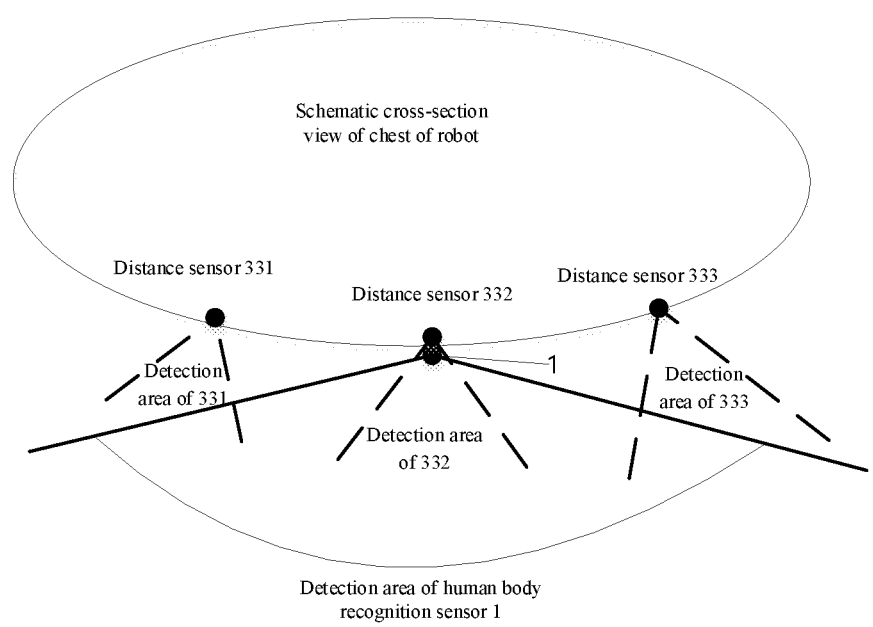
FIG. 4 is a schematic view of a sensor detection area in some embodiments of the disclosure.

In some embodiments of the present disclosure, as shown in FIGS. 2 and 4, the mounted device comprises at least one distance sensor, wherein the sum of the detection ranges of all the distance sensors contains a detection range of the human body recognition sensor. That is, the sum of the detection ranges of all the distance sensors may cover a detection range of the human body recognition sensor.

In some embodiments of the present disclosure, as shown in FIG. 2 and FIG. 4, the human body recognition sensor and all the distance sensors are arranged on the service robot; the distance sensors are all arranged on the same horizontal plane at a predetermined distance from the human body recognition sensor.

Figure 10:
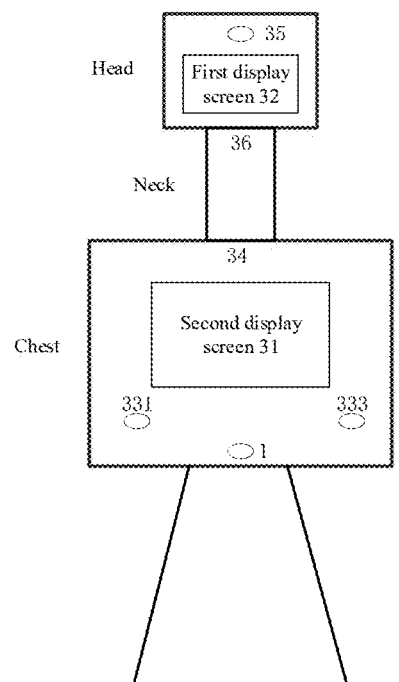
FIG. 10 is a schematic view of the position of each module of the service robot in the service robot in some embodiments of the present disclosure.

In some embodiments of the present disclosure, as shown in FIG. 10, the distance sensors are symmetrically arranged on both sides of a plane perpendicular to the horizontal plane passing through the human body recognition sensor in the case where the mounted device comprises an even number of distance sensors.

In some embodiments of the present disclosure, as shown in FIG. 2 and FIG. 4, in the case where the mounted device comprises an odd number of distance sensors, one distance sensor is arranged on a plane perpendicular to the horizontal plane passing through the human body recognition sensor, and the other distance sensors are symmetrically arranged on both sides of the plane perpendicular to the horizontal plane passing through the human body recognition sensor.

The controller 2 is configured to determine an orientation of the user relative to the service robot according to the distance of the user relative to the service robot and the position of the distance sensor, and control the head of the service robot to rotate to an orientation corresponding to the user along the horizontal direction.

In some embodiments of the present disclosure, the controller 2 may also be configured to control the first display screen to rotate to an orientation corresponding to the user along the horizontal direction according to the distance and orientation of the user relative to the service robot, and control the first display screen to make corresponding facial expression changes.

FIG. 4 is a schematic view of a sensor detection area in some embodiments of the disclosure. FIG. 4 is a schematic cross-sectional view of the chest of the service robot. As shown in FIGS. 2 and 4, the human body recognition sensor 1 is a human body recognition sensor located on the chest of the service robot with a detection angle of 120° and a detection distance of 2 meters; the distance sensor 33 may comprise a first ultrasonic sensor 331, a second ultrasonic sensor 332 and a third ultrasonic sensor 333 located on the chest with a detection distance of 2 meters and a detection angle of 60°.

As shown in FIGS. 2 and 4, the first ultrasonic sensor 331, the second ultrasonic sensor 332 and the third ultrasonic sensor 333 are located below the second display screen 31, and the human body recognition sensor 1 is located below the second ultrasonic sensor 332.

In some embodiments of the present disclosure, as shown in FIG. 3, the mounted device 3 in the embodiment of FIG. 1 or 3 may further comprise a latitudinal rotation mechanism 34, wherein the latitudinal rotation mechanism 34 is configured to perform latitudinal rotation according to an instruction of the controller 2, so as to drive the first display screen 32 to rotate to a corresponding orientation along the horizontal direction.

In some embodiments of the present disclosure, as shown in FIG. 2, the latitudinal rotation mechanism 34 may be implemented as a first steering gear. The latitudinal rotation mechanism 34 is located on the chest of the robot and supports the neck of the robot. The latitudinal rotation mechanism 34 rotates so that it is possible to realize the rotation of the neck of the robot along the horizontal direction, that is, it is possible to realize the latitudinal rotation of the head of the service robot (comprising the first display screen).

In some embodiments of the present disclosure, as shown in FIG. 2 or 3, the mounted device 3 in the embodiment of FIG. 1 or 3 may further comprise a camera 35.

As shown in FIG. 2, the camera 35 is arranged above the first display screen 32.

The camera 35 is configured to capture a camera view according to an instruction of the controller in the case where the controller receives the start signal.

The controller 2 is configured to recognize a face area in the camera view, and adjust a pitch angle and a horizontal angle of the first display screen 32 according to a position of the face area in the camera view, so that the face area is located in the central area of the camera view.

In some embodiments of the present disclosure, as shown in FIG. 2 or 3, the mounted device 3 in the embodiment of FIG. 1 or 3 may further comprise a pitch mechanism 36.

The controller 2 is configured to calculate a distance between the position of the face area in the camera view and the position of the central area of the camera view according to the position of the face area in the camera view, and convert the distance into adjustment angles of the pitch angle and the horizontal angle of the first display screen 32.

The pitch mechanism 36 and the latitudinal rotation mechanism 34 are configured to perform pitch rotation and latitudinal rotation based on the adjustment angles according to an instruction of the controller 2, so as to drive the first display screen 32 to perform pitching movement and latitudinal rotation, so that the face area is located in the central area of the camera view.

In some embodiments of the present disclosure, the pitch mechanism 36 may be implemented as a second steering gear.

In some embodiments of the present disclosure, as shown in FIG. 2, the latitudinal rotation mechanism 34 is located within the chest of the robot and supports the neck of the robot. The latitudinal rotation mechanism 34 rotates so that it is possible to realize the rotation of the robot neck along the horizontal direction. The pitch mechanism 36 is located at a position where the head and neck of the robot are fixed. The pitch mechanism 36 rotates so that it is possible to control the head of the robot to perform pitch selection. The latitudinal rotation mechanism 34 cooperates with the pitch mechanism 36 so that it is possible to realize the rotation of the head of the robot in both the horizontal and vertical degrees of freedom.

The service robot provided on the basis of the above-described embodiments of the present disclosure is mainly used for a service robot. The pyroelectric and ultrasonic sensors cooperate so that it is possible to detect the orientation of the user, and the image of the user is captured by the camera and the processor performs facial detection with a detection result as a basis for adjusting the pitch angle and horizontal angle of the first display screen. Accordingly, it is possible to implement that the first display screen always faces towards the user, so that the user has the feeling of being watched, and the user will feel the respect psychologically. The robot is entitled with more anthropomorphic characteristics, thereby improving the user experience.

The first display screen of the robot according to the present disclosure is in a standby state when there is no user, and in the case where a user approaches the robot, the first display screen starts to light up, so that the user can feel an anthropomorphic communication mode of the robot during the use of the robot.

Figure 5:
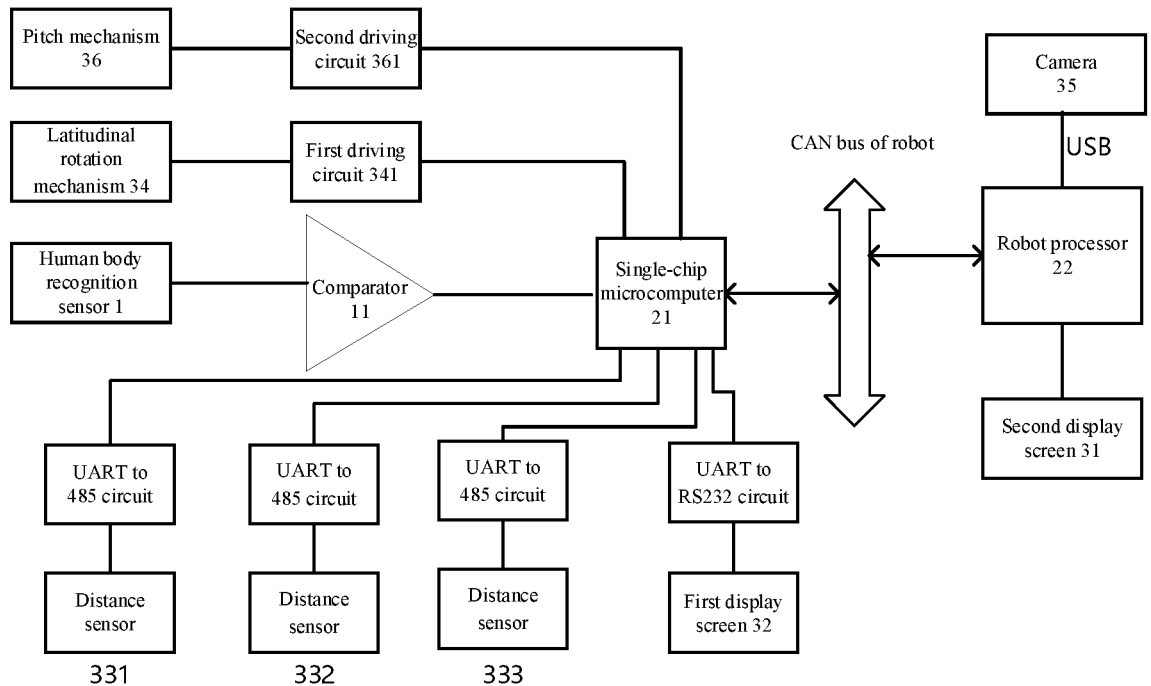
FIG. 5 is a schematic view of further embodiments of the service robot according to the present disclosure.

FIG. 5 is a schematic view of further embodiments of the service robot according to the present disclosure. As shown in FIG. 5, the controller of the present disclosure (for example, the controller 2 in the embodiments of FIG. 1 or 3) may comprise a single-chip microcomputer 21 and a robot processor 22.

The microcontroller 21 is connected to the robot processor 22 through a CAN (Controller Area Network) bus.

In some embodiments of the present disclosure, as shown in FIG. 5, the CAN bus may be a robot CAN bus.

As shown in FIG. 5, the single-chip microcomputer 21 is connected to the pitch mechanism 36, the latitudinal rotation mechanism 34, the human body recognition sensor 1, the distance sensor 33 and the first display screen 32 respectively.

As shown in FIG. 5, the robot processor 22 is connected to the camera 35 and the second display screen 31 respectively.

In some embodiments of the present disclosure, as shown in FIG. 5, the first ultrasonic sensor 331, the second ultrasonic sensor 332 and the third ultrasonic sensor 333 select the RS485 interface, and the communication between the ultrasonic sensor and the single-chip microcomputer 21 is required to be converted by the RS485 to UART (Universal Asynchronous Receiver/Transmitter) circuit.

In some embodiments of the present disclosure, as shown in FIG. 5, the first display screen 32 uses RS232 communication, and the content to be displayed is sent by the microcontroller 21 through the UART. The UART to RS232 circuit converts the UART level into the RS232 level, and the first display screen 32 receives an instruction to change the displayed content according to information of the instruction.

In some embodiments of the present disclosure, as shown in FIG. 5, the service robot may further comprise a comparator 11.

The comparator 11 is connected to the human body recognition sensor 1 and the single-chip microcomputer 21 respectively.

The human body recognition sensor 1 outputs high and low levels. When a person approaches, the level output by the pyroelectric sensor may change. The level output by the human body recognition sensor 1 is compared by the comparator 11, which outputs a comparison result to the single-chip microcontroller 21 for recognition.

The service robot is in a standby state when there is no user around. When a person approaches with a distance of 2 meters, the human body recognition sensor 1 outputs a high level, and the comparator 11 makes comparison to output the TTL level. The single-chip microcontroller 21 reports the information that a person approaches to the robot processor 22 through the CAN bus within the robot, and the robot processor 22 awakens the device mounted on the robot. The service content to be displayed is output to the second display screen 31 for display through HDMI (High Definition Multimedia Interface).

In some embodiments of the present disclosure, as shown in FIG. 5, the robot processor 22 outputs the content to be displayed to the second display screen 31 for display through the HDMI interface.

In some embodiments of the present disclosure, as shown in FIG. 5, the camera 35 on the first display screen 32 communicates with the processor through a USB interface.

In some embodiments of the present disclosure, as shown in FIG. 5, the service robot may further comprise a first driving circuit 341 and a second driving circuit 361.

The first driving circuit 341 is configured to drive the latitudinal rotation mechanism 34 to rotate along the horizontal direction according to an instruction of the single-chip microcomputer 21.

The second driving circuit 361 is configured to drive the pitch mechanism 36 to rotate along the vertical direction according to an instruction of the single-chip microcomputer 21.

In some embodiments of the present disclosure, as shown in FIG. 4, each ultrasonic sensor has a detection distance of 2 meters and a detection angle of 60°. After the robot is awakened, it means that the distance between the user and the robot is less than 2 meters. The distance between the user and the robot is detected by the ultrasonic wave. If the first ultrasonic sensor 331 detects a user with a distance of less than 2 meters, the microcontroller 21 sends an instruction to the first driving circuit 341 to drive the latitudinal rotation mechanism 34 to rotate along the horizontal direction, so that the first display screen 32 is toward the direction of the first ultrasonic sensor 331, and the single-chip microcomputer 21 sends an instruction to the first display screen 32 to display the preset content.

Figure 6:
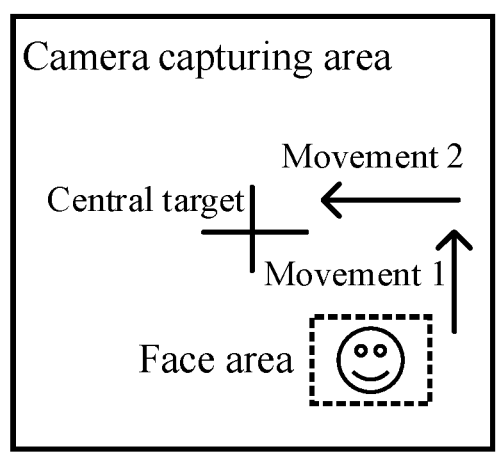
FIG. 6 is a schematic view of rotation of a first display screen of the service robot in some embodiments of the present disclosure.

FIG. 6 is a schematic view of rotation of a first display screen of the service robot in some embodiments of the present disclosure. After the rotation of the latitudinal rotation mechanism 34 is completed, the first display screen 32 may face the direction of the user, and the user may enter the range of the field of view captured by the camera 35, as shown in FIG. 6. The camera 35 may transmit the collected image to the robot processor 22 through the USB, and the robot processor 22 runs the facial detection algorithm, and frames the nearest face; and the distance between the face area and the central area of the camera 35 is calculated, and the rotation angles of the latitudinal rotation mechanism 34 and the pitch mechanism 36 are adjusted according to the two steps of the movement 1 and the movement 2.

The robot processor 22 sends an instruction to the single-chip microcomputer 21 to rotate the latitudinal rotation mechanism 34 and the pitch mechanism 36 through the CAN bus. After the instruction is received, the single-chip 21 controls the pitch mechanism 36 to rotate along an opposite direction of the movement 1, and controls the latitudinal rotation mechanism 34 to rotate along an opposite direction of the movement 2, and gradually places the face area in the central area of the cross target of the camera 35.

In the above-described embodiments of the present disclosure, after the attitude adjustment of the first display screen 32, the first display screen 32 always faces towards the user, so that the user may experience the feeling of being watched.

The above-described embodiments of the present disclosure may be used for a service robot. The first display screen 32 of the robot is in a standby state when there is no user. When a user approaches the robot with a distance reaching 2 meters, the pyroelectric sensor may detect that a person approaches so as to awaken the robot. The distance sensor 33 located on the chest of the robot measures the distance and orientation of the user, and the first display screen 32 rotates to a corresponding orientation along the horizontal direction, and makes expression changes accordingly. The camera located on the first display screen 32 recognizes the face area, and adjusts the pitch angle of the first display screen 32 according to a position of the face in the screen, so that the face area is located in the central area of the camera view. By way of the rotational movements and expression changes of the first display screen 32, the user may have the feeling of attention, thereby improving the interactive experience.

Figure 7:
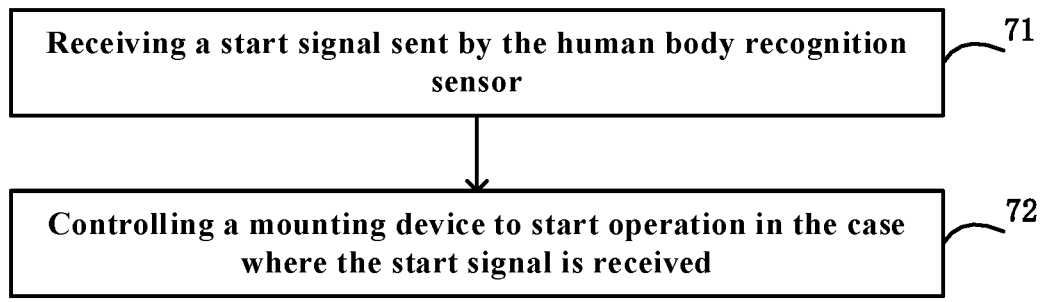
FIG. 7 is a schematic view of some embodiments of the display control method of a service robot according to the present disclosure.

FIG. 7 is a schematic view of some embodiments of the display control method of a service robot according to the present disclosure. Preferably, this embodiment may be performed by the service robot according to the present disclosure or the controller according to the present disclosure. The method comprises the following steps 71 and 72.

Step 71: the start signal sent by the human body recognition sensor 1 is received, wherein the human body recognition sensor 1 detects whether there is a user within a predetermined range around the service robot, and outputs the start signal to the controller 2 in the case where a user appears within a predetermined range around the service robot (for example, the distance between the user and the service robot is less than or equal to the predetermined distance).

Step 72: the mounted device 3 is controlled to start operation in the case where the start signal is received.

In some embodiments of the present disclosure, in the step 72, the step of controlling the mounted device 3 to start operation may further comprise: controlling the distance sensor 33 to start operation, and measuring the distance between the user and the service robot; and determine an orientation of the user relative to the service robot according to the distance between the user and the service robot and the position of the distance sensor, and control the head of the service robot to rotate to an orientation corresponding to the user along the horizontal direction.

In some embodiments of the present disclosure, in the step 72, the step of controlling the mounted device 3 to start operation may further comprise: controlling the first display screen 32 to rotate to an orientation corresponding to the user along the horizontal direction according to the distance and orientation of the user relative to the service robot, and controlling the first display screen make corresponding expression changes.

In some embodiments of the present disclosure, in the step 72, the step of controlling the mounted device 3 to start operation may further comprise: controlling the camera 35 to start operation, and capturing a camera view; recognizing the face area in the camera view, and adjusting the pitch angle and horizontal angle of the first display screen 32 according to the position of the face area in the camera view so that the face area is located in the central area of the camera view.

In some embodiments of the present disclosure, the step of adjusting the pitch angle and horizontal angle of the first display screen 32 according to the position of the face area in the camera view so that the face area is located in the central area of the camera view may comprise: calculating a distance between the position of the face area in the camera view and the position of the central area of the camera view according to the position of the face area in the camera view, and converting the distance into the adjustment angle of the pitch angle and horizontal angle of the first display screen 32; and controlling the pitch mechanism 36 and the latitudinal rotation mechanism 34 to perform pitch rotation and latitudinal rotation according to the adjustment angle as described, so as to drive the first display screen 32 to perform pitch rotation and latitudinal rotation, so that the face area is located in the central area of the camera view.

In some embodiments of the present disclosure, the display control method of a service robot may further comprise: receiving a standby signal sent by the human body recognition sensor 1, wherein the human body recognition sensor 1 outputs the standby signal to the controller 2 in the case where a distance between the user and the service robot is greater than the predetermined distance; and controlling the mounted device 3 to be in a standby state in the case where the standby signal is received.

In some embodiments of the present disclosure, the display control method of a service robot may further comprise: controlling the second display screen 31 and the first display screen 32 to display corresponding content to the user.

The display control method of a service robot provided on the basis of the above-described embodiments of the present disclosure may be applied to a service robot. It is an object of the above-described embodiments of the present disclosure to improve the performance of display interaction of the service robot, so that the user can feel an anthropomorphic communication mode of the robot during the use of the robot. In this way, the robot is more vital and vivid, thereby improving the user experience.

The above-described embodiments of the present disclosure may better anthropomorphize the service robot, and improve the performance of display interaction of the robot, so that the user feels the eye interaction similar to that during communication with a person.

Figure 8:
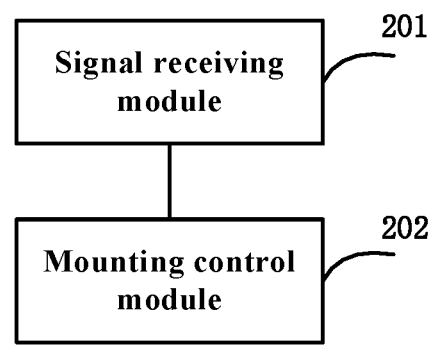
FIG. 8 is a schematic view of some embodiments of the controller according to the present disclosure.

FIG. 8 is a schematic view of some embodiments of the controller according to the present disclosure. The controller according to the present disclosure (for example, the controller 2 in the embodiment of FIG. 1 or 3) may comprise a signal receiving module 201 and a mounting control module 202.

The signal receiving module 201 is configured to receive a start signal sent by the human body recognition sensor 1, wherein the human body recognition sensor 1 detects whether a user appears within a predetermined range around the service robot, and outputs the start signal to the controller 2 in the case where a user appears within a predetermined range around the service robot (for example, the distance between the user and the service robot is less than or equal to the predetermined distance).

The mounting control module 202 is configured to control the mounted device 3 to start operation in the case where the start signal is received.

In some embodiments of the present disclosure, the mounting control module 202 may be configured to control the distance sensor 33 to start operation, measure a distance between the user and the service robot, and determine an orientation of the user relative to the service robot according to the distance between the user and the service robot and the position of the distance sensor in the case where the start signal is received; control the first display screen 32 to rotate to an orientation corresponding to the user along the horizontal direction according to the distance and orientation of the user relative to the service robot, and control the first display screen 32 to make corresponding expression changes.

In some embodiments of the present disclosure, the mounting control module 202 may be configured to control the camera 35 to start operation and capture a camera view in the case where the start signal is received; recognize the face area in the camera view, and adjust the pitch angle and horizontal angle of the first display screen 32 according to the position of the face area in the camera view so that the face area is located in the central area of the camera view.

In some embodiments of the present disclosure, the mounting control module 202 may be configured to calculate a distance between the position of the face area in the camera view and the position of the central area of the camera view according to a position of the face area in the camera view, and convert the distance into an adjustment angle of the pitch angle and horizontal angle of the first display screen 32; control the pitch mechanism 36 and the latitudinal rotation mechanism 34 to perform pitch rotation and latitudinal rotation based on the adjustment angle, so as to drive the first display screen 32 to perform pitch movement and latitudinal rotation, so that the face area is located in the central area of the camera view.

In some embodiments of the present disclosure, the controller 2 may also be configured to receive a standby signal sent by the human body recognition sensor 1, wherein the human body recognition sensor 1 outputs a standby signal to the controller in the case where a distance between the user and the service robot is greater than the predetermined distance; and control the mounted device 3 to be in a standby state in the case where the standby signal is received.

In some embodiments of the present disclosure, the controller 2 may also be configured to control the second display screen 31 and the first display screen 32 to display corresponding content to the user.

In some embodiments of the present disclosure, the controller 2 may be configured to perform operations for implementing the display control method of a service robot according to any one of the above-described embodiments (for example, the embodiment in FIG. 7).

The controller provided on the basis of the above-described embodiments of the present disclosure may be applied to a service robot. It is an object of the above-described embodiments of the present disclosure to improve the performance of display interaction of the service robot, so that the user can feel an anthropomorphic communication mode of the robot during the use of the robot. In this way, the robot is more vital and vivid, thereby improving the user experience.

Figure 9:
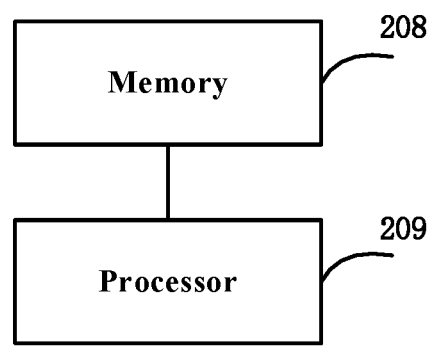
FIG. 9 is a schematic view of other embodiments of the controller according to the present disclosure.

FIG. 9 is a schematic view of other embodiments of the controller according to the present disclosure. The controller according to the present disclosure (for example, the controller 2 in the embodiment of FIG. 1 or 3) may comprise a memory 208 and a processor 209.

The memory 208 is configured to store instructions.

The processor 209 is configured to execute the instructions, so that the controller 2 performs operations of implementing the display control method of a service robot described according to any one of the above-described embodiments (for example, the embodiment in FIG. 7).

The above-described embodiments of the present disclosure may better anthropomorphize the service robot, and improve the performance of display interaction of the robot, so that the user feels the eye interaction similar to that during communication with a person.

According to another aspect of the present disclosure, a computer-readable storage medium is provided, wherein the computer-readable storage medium stores computer instructions, which when executed by a processor implements the display control method of a service robot according to any one of the above-described embodiments (for example, the embodiment of FIG. 7).

Based on the computer-readable storage medium provided on the basis of the above-described embodiments of the present disclosure, it is possible to improve the performance of display interaction of the service robot, so that the user can feel an anthropomorphic communication mode of the robot during the use of the robot. In this way, the robot is more vital and vivid, thereby improving the user experience.

The above-described embodiments of the present disclosure may better anthropomorphize the service robot, and improve the performance of display interaction of the robot, so that the user feels the eye interaction similar to that during communication with a person.

The controller described above may be implemented as a general purpose processor, a programmable logic controller (PLC), a digital signal processor (DSP), an application specific integrated circuit (ASIC), a field-programmable gate array (FPGA) or other programmable logic devices, discrete gates or transistor logic devices, discrete hardware assemblies or any proper combination thereof, which is configured to perform the functions described in the present application.

Hitherto, the present disclosure has been described in detail. Some details well known in the art are not described in order to avoid obscuring the concept of the present disclosure. According to the above description, those skilled in the art would fully understand how to implement the technical solutions disclosed here.

Those of ordinary skill in the art may understand that all or some of the steps in the above-described embodiments may be accomplished by hardware, or by programs to instruct relevant hardware. The programs may be stored in a computer-readable storage medium. The storage medium as mentioned above may be read-only memory, magnetic disk or optical disk, and the like.

Descriptions of the present disclosure, which are made for purpose of exemplification and description, are not absent with omissions or limit the present disclosure to the forms as disclosed. Many modifications and variations are apparent for those skilled in the art. The embodiments are selected and described in order to better explain the principles and actual application of the present disclosure, and enable those skilled in the art to understand the present disclosure so as to design various embodiments adapted to particular purposes and comprising various modifications.

What is claimed is:

1. A service robot comprising:
   a human body recognition sensor configured to detect whether a user appears within a predetermined range around the service robot;
   a controller; and
   a mounted device, wherein the human body recognition sensor is configured to output a start signal to the controller in the case where a user appears within a predetermined range around the service robot, the controller is configured to control the mounted device to start operation in the case where the start signal is received, the mounted device is configured to start operation according to a control instruction of the controller, the mounted device comprises a plurality of distance sensors, a first display screen arranged on the head of the service robot, and a camera arranged above the first display screen and configured to capture a camera view in the case where the controller receives the start signal, the human body recognition sensor and the plurality of distance sensors are located on the chest, the sum of detection ranges of all the distance sensors contains a detection range of the human body recognition sensor, one distance sensor is arranged on a plane perpendicular to a horizontal plane passing through the human body recognition sensor, and the other distance sensors are symmetrically arranged on both sides of the plane perpendicular to the horizontal plane passing through the human body recognition sensor in a case where the mounted device comprises an odd number of distance sensors; the distance sensors are configured to measure a distance between the user and the service robot after the operation is started, and the controller is further configured to determine an orientation of the user relative to the service robot according to the distance of the user relative to the service robot and positions of the distance sensors, control a head of the service robot to rotate to the orientation corresponding to the user along the horizontal direction, recognize a face area in the camera view, calculate a distance between a position of the face area in the camera view and a position of a central area of the camera view, convert the distance between the position of the face area in the camera view and the position of the central area of the camera view into adjustment angles of a pitch angle and a horizontal angle of the first display screen, and adjust the pitch angle and the horizontal angle of the first display screen according to the adjustment angles, so that the face area is located in the central area of the camera view.

2. The service robot of claim 1, wherein:
   the human body recognition sensor and all the distance sensors are provided on the service robot; and
   the distance sensors are all arranged on the same horizontal plane at a predetermined distance from the human body recognition sensor.

3. The service robot of claim 2, wherein:
   the distance sensors are symmetrically arranged on both sides of a plane perpendicular to the horizontal plane passing through the human body recognition sensor in a case where the mounted device comprises an even number of distance sensors.

4. The service robot according to claim 1, wherein
   the controller is configured to control the first display screen to rotate to the orientation corresponding to the user along the horizontal direction according to the distance and orientation of the user relative to the service robot, and control the first display screen to make corresponding expression changes.

5. The service robot of claim 4, wherein the mounted device further comprises:
   a second display screen configured to display corresponding service content to the user according to an instruction of the controller in the case where the controller receives the start signal.

6. The service robot of claim 5, wherein the controller comprises a single-chip microcontroller and a robot processor, wherein:
   the single-chip microcontroller is connected to the robot processor through a CAN bus;
   the single-chip microcontroller is connected to the pitch mechanism, the distance sensor and the first display screen respectively; and
   the robot processor is connected to the camera and the second display screen respectively.

7. A display control method of a service robot, comprising:
   receiving a start signal sent by a human body recognition sensor, wherein the human body recognition sensor detects whether a user appears within a predetermined range around the service robot, and outputs the start signal to the controller in the case where a user appears within a predetermined range around the service robot; and
   controlling the mounted device to start operation in the case where the start signal is received, wherein the mounted device comprises a plurality of distance sensors, a first display screen arranged on the head of the service robot and a camera arranged above the first display screen, the human body recognition sensor and the plurality of distance sensors are located on the chest, the sum of detection ranges of all the distance sensors contains a detection range of the human body recognition sensor, one distance sensor is arranged on a plane perpendicular to a horizontal plane passing through the human body recognition sensor, and the other distance sensors are symmetrically arranged on both sides of the plane perpendicular to the horizontal plane passing through the human body recognition sensor in a case where the mounted device comprises an odd number of distance sensors; and the controlling the mounted device to start operation comprises: controlling the distance sensors to start operation, and measuring a distance between the user and the service robot, and controlling the camera to start operation, and capture a camera view;

determining an orientation of the user relative to the service robot according to the distance of the user relative to the service robot and positions of the distance sensors, and controlling the head of the service robot to rotate to the orientation corresponding to the user along the horizontal direction; and recognizing a face area in the camera view, calculating a distance between a position of the face area in the camera view and a position of a central area of the camera view according to the position of the face area in the camera view, converting the distance between the position of the face area in the camera view and the position of the central area of the camera view into adjustment angles of a pitch angle and a horizontal angle of the first display screen, and adjusting the pitch angle and the horizontal angle of the first display screen according to the adjustment angles, so that the face area is located in the central area of the camera view.

8. The display control method of a service robot according to claim 7, further comprising:
controlling the first display screen to rotate to an orientation corresponding to the user along the horizontal direction according to the distance and orientation of the user relative to the service robot, and controlling the first display screen to make corresponding expression changes.

9. A non-transitory computer-readable storage medium, wherein the computer-readable storage medium stores computer instructions, which when executed by a processor implements the display control method of a service robot according to claim 8.

10. A non-transitory computer-readable storage medium, wherein the computer-readable storage medium stores computer instructions, which when executed by a processor implements the display control method of a service robot according to claim 7.

11. A controller comprising:
a memory configured to store instructions; and
a processor coupled to the memory, which is configured to execute a method for performing instructions comprising:

receiving a start signal sent by a human body recognition sensor, wherein the human body recognition sensor detects whether a user appears within a predetermined range around the service robot, and outputs the start signal to the controller in the case where a user appears within a predetermined range around the service robot;

controlling the mounted device to start operation in the case where the start signal is received, wherein the mounted device comprises a plurality of distance sensors, a first display screen arranged on the head of the service robot and a camera arranged above the first display screen, the human body recognition sensor and the plurality of distance sensors are located on the chest, the sum of detection ranges of all the distance sensors contains a detection range of the human body recognition sensor, one distance sensor is arranged on a plane perpendicular to a horizontal plane passing through the human body recognition sensor, and the other distance sensors are symmetrically arranged on both sides of the plane perpendicular to the horizontal plane passing through the human body recognition sensor in a case where the mounted device comprises an odd number of distance sensors; and the controlling the mounted device to start operation comprises: controlling the distance sensors to start operation, and measuring a distance between the user and the service robot, and controlling the camera to start operation, and capture a camera view; and determining an orientation of the user relative to the service robot according to the distance of the user relative to the service robot and positions of the distance sensors, and controlling the head of the service robot to rotate to the orientation corresponding to the user along the horizontal direction, and recognizing a face area in the camera view, calculating a distance between a position of the face area in the camera view and a position of a central area of the camera view according to the position of the face area in the camera view, converting the distance between the position of the face area in the camera view and the position of the central area of the camera view into adjustment angles of a pitch angle and a horizontal angle of the first display screen, and adjusting the pitch angle and the horizontal angle of the first display screen according to the adjustment angles, so that the face area is located in the central area of the camera view.

12. The controller according to claim 11, wherein the instructions further comprise:
controlling the first display screen to rotate to an orientation corresponding to the user along the horizontal direction according to the distance and orientation of the user relative to the service robot, and controlling the first display screen to make corresponding expression changes.

* * * * *